United States Patent
Gomi

(10) Patent No.: US 7,859,582 B2
(45) Date of Patent: Dec. 28, 2010

(54) SOLID-STATE IMAGING APPARATUS AND IMAGING APPARATUS SYSTEM USING THE SAME

(75) Inventor: Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 586 days.

(21) Appl. No.: 11/806,320

(22) Filed: May 31, 2007

(65) Prior Publication Data

US 2007/0285548 A1   Dec. 13, 2007

(30) Foreign Application Priority Data

Jun. 1, 2006   (JP) ............................. 2006-153490

(51) Int. Cl.
*H04N 3/14* (2006.01)
*H04N 5/335* (2006.01)

(52) U.S. Cl. ...................................... 348/308; 348/294

(58) Field of Classification Search ......... 348/294–324; 257/291; 250/208.1, 208.2, 208.3
See application file for complete search history.

(56) References Cited

U.S. PATENT DOCUMENTS

| 5,262,871 | A * | 11/1993 | Wilder et al. | 348/307 |
|---|---|---|---|---|
| 6,839,452 | B1 * | 1/2005 | Yang et al. | 382/103 |
| 7,289,150 | B2 * | 10/2007 | Harada | 348/323 |
| 2002/0067416 | A1 * | 6/2002 | Yoneda et al. | 348/304 |
| 2005/0018064 | A1 * | 1/2005 | Itoh et al. | 348/308 |
| 2005/0206757 | A1 * | 9/2005 | Itoh | 348/294 |
| 2005/0259169 | A1 * | 11/2005 | Ito et al. | 348/308 |
| 2006/0012698 | A1 * | 1/2006 | Nitta et al. | 348/308 |
| 2006/0164529 | A1 * | 7/2006 | Shimizu | 348/308 |

FOREIGN PATENT DOCUMENTS

| JP | 06-141225 | 5/1994 |
|---|---|---|
| JP | 2000-156823 A | 6/2000 |

* cited by examiner

*Primary Examiner*—David L Ometz
*Assistant Examiner*—Antoinette T Spinks
(74) *Attorney, Agent, or Firm*—Westerman, Hattori, Daniels & Adrian, LLP

(57) ABSTRACT

A solid-state imaging apparatus including a pixel section having a plurality of pixels arrayed in two dimensions, each having a photoelectric conversion device, a means for resetting signal accumulated at the photoelectric conversion device, a memory means for retaining signal accumulated at the photoelectric conversion device, and a transfer means for transferring signal accumulated at the photoelectric conversion device to the memory means, the signal retained at the memory means being outputted as signal of the pixel, and further including: a global control means, the pixel section having a plurality of pixel regions divided in row direction, for concurrently effecting the reset operation and the transfer operation, respectively, with treating the divided pixel region as a unit; a vertical scanning means for controlling sequence in outputting signals of the pixels with treating the divided pixel region as a unit; and a first and a second horizontal read means for outputting signals of the pixels of two pixel regions in parallel with considering the divided pixel region as unit.

2 Claims, 12 Drawing Sheets

FIG. 1 PRIOR ART
| G | R | G | R | G | R | G | R |
|---|---|---|---|---|---|---|---|
| B | G | B | G | B | G | B | G |
| G | R | G | R | G | R | G | R |
| B | S1 | B | S1 | B | S1 | B | S1 |
| G | R | G | R | G | R | G | R |
| B | S2 | B | S2 | B | S2 | B | S2 |
| G | R | G | R | G | R | G | R |
| B | G | B | G | B | G | B | G |
} ROW OF NORMAL COLOR ARRANGEMENT
} ROW CONTAINING FIRST PHASE SENSOR
} ROW CONTAINING SECOND PHASE SENSOR
} ROW OF NORMAL COLOR ARRANGEMENT
FIG. 2A PRIOR ART
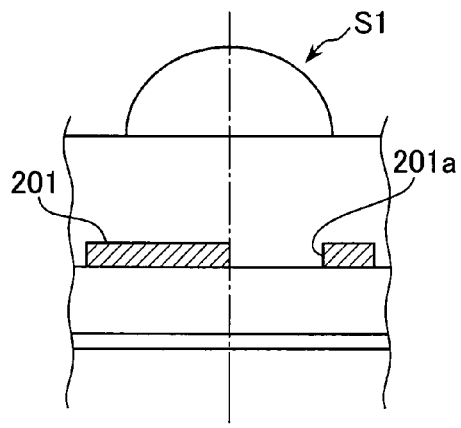
FIG. 2B PRIOR ART
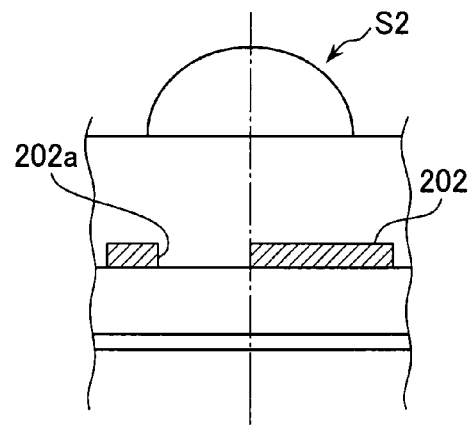

SOLID-STATE IMAGING APPARATUS AND IMAGING APPARATUS SYSTEM USING THE SAME

This application claims benefit of Japanese Patent Application No. 2006-153490 filed in Japan on Jun. 1, 2006, the contents of which are incorporated by this reference.

BACKGROUND OF THE INVENTION

The present invention relates to solid-state imaging apparatus and to imaging apparatus system using the same where an imaging signal for forming image and a control signal such as AF and AE signals for determining image taking conditions are concurrently outputted.

Those digital cameras having an optical system for optically forming object image, a solid-state imaging device for converting the optical object image into electrical signals, a recording section for recording the taken object picture image, and a display section for displaying taken image have recently become common as an image recording means or image display means similarly to the film cameras and video cameras. Particularly of the single lens reflex type digital cameras, since there is great need for instantaneously taking a still picture in the same manner as a film camera, it is demanded to reduce time from the pressing of a release switch to the taking of image.

For such reason, in the single lens reflex type digital camera, an exclusive sensor separate from a solid-state imaging device is used to acquire signals for use in control of the camera's image taking system such as AF or AE. In system of such construction, there are problems as will be described below. In particular, since an image taking luminous flux and AE and AF detecting luminous flux pass through separate optical paths from each other, there is a problem that a lowered AF and AE accuracy occurs due to an error in form at the time of temperature change resulting from a component precision error of each component, attaching error of each component, or material difference between each component.

As a means for solving such problem, the following technique is disclosed in Japanese Patent Application Laid-Open 2000-156823. Such technique will be briefly described below by way of FIG. 1 and FIGS. 2A, 2B. FIG. 1 is a diagram showing color filter arrangement, and FIGS. 2A, 2B illustrate a cross sectional structure of pixel. This solid-state imaging apparatus disclosed in the publication has pixels exclusively for AF without having color filter (those pixels represented by S1, S2 in FIG. 1) in addition to the pixels having the respective filter of R (red), G (green), B (blue) for effecting an imaging on the imaging device sensor (pixels represented by R, G, B, in FIG. 1). Of the two exclusive AF pixels S1, S2, one or first exclusive AF pixel S1 (first phase sensor) has a shielding layer 201 which is provided with an opening portion 201a deviated as shown in FIG. 2A toward one side from the center of pixel, and the other or second exclusive AF pixel S2 (second phase sensor) has a shielding layer 202 having an opening 202a as shown in FIG. 2B at a location deviated by an equal distance from the center of pixel and toward the side opposite from the exclusive AF pixel S1.

In a solid-state imaging device having the exclusive AF pixels of such construction, if focus of the camera lens for forming an image on solid-state imaging device is focused on the image plane of the solid-state imaging device, there is a coincidence between image signals of a group of pixels S1 of the row containing the first exclusive AF pixels S1 and image signals from a signal group of the pixels S2 of the row containing the second exclusive AF pixels S2. If, however, the point of focus is forward or backward from the image plane of the solid-state imaging device, a phase difference occurs between the image signals from the group of pixels S1 of the row containing the first exclusive AF pixels and the image signals from the signal group of the pixels S2 containing the second exclusive AF pixels S2.

In this manner, if AF system is a phase difference system where a pupil division is conducted on the solid-state imaging device, an error factor as described above due to construction where the solid-state imaging device and AF sensor are formed of separate device is eliminated, since the pixels for normal image taking and exclusive AF pixels (AF sensor) of the solid-state imaging device are formed of the same device.

Among AF apparatus for obtaining a focused point by an operation processing of image signals obtained from the object image formed on the image plane of the solid-state imaging device, there is an AF system of the so-called hill climbing method where the taking lens is moved toward the direction along which value for indicating the degree of focus is increased, and the moving of the taking lens is stopped when a peak position has been detected. The hill climbing method takes notice of the fact that contrast information consisting of high-frequency components in the image signals is increased as image comes closer to a focus. Such high-frequency component fetched from the imaging signals for example through a band-pass filter is detected as the signal for indicating the degree of focus.

In AF device using the hill climbing method, a contrast information (contrast value) is obtained while moving the taking lens forward or backward so as to find a position where such value is maximum. To increase the speed of AF operation, therefore, it is necessary to increase the read speed of image signals from the imaging device, that is, to increase frame rate. For this purpose, Japanese Patent Application Laid-Open hei-6-141225 discloses a method in which frame rate during AF operation is increased by reading signals only from those pixels in a partial region as shown in FIG. 3 instead of reading the signals of all pixels from the imaging device. Referring to FIG. 3, what is denoted by numeral 301 is an imaging region of the solid-state imaging device which is formed by an arrangement of a plurality of pixels 302. What is denoted by numeral 312 is AF area, and only pixels 311 denoted by hatching within it are read out to achieve high rate.

SUMMARY OF THE INVENTION

There is provided a solid-state imaging apparatus in accordance with a first aspect of the invention, including a pixel section having a plurality of pixels arrayed in two dimensions, each having a photoelectric conversion device, a means for resetting signal accumulated at the photoelectric conversion device, a memory means for retaining signal accumulated at the photoelectric conversion device, and a transfer means for transferring signal accumulated at the photoelectric conversion device to the memory means, the signal retained at the memory means being outputted as signal of the pixel. It further includes: a global control means, the pixel section having a plurality of pixel regions divided in row direction, for concurrently effecting the reset operation and the transfer operation, respectively, with treating the divided pixel region as a unit; a vertical scanning means for controlling sequence in outputting signals of the pixels with treating the divided pixel region as a unit; and a first and a second horizontal read means for outputting signals of the pixels of two pixel regions in parallel with considering the divided pixel region as unit.

In a second aspect of the invention, after passage of a desired accumulation time from the reset operation with respect to all pixels of the pixel section which is concurrently effected by the global control means, the first horizontal read means of the solid-state imaging apparatus according to the first aspect outputs signals of all pixels obtained by concurrently effecting the transfer operation, and the second horizontal read means, with respect to an optional pixel region narrower than said pixel section selected from the plurality of divided pixel regions, outputs signals of the pixels of the optional pixel region which is obtained as a result that the global control means respectively effects the reset operation and the transfer operation on regular interval.

In a third aspect of the invention, there is provided an imaging apparatus system including: the solid-state imaging apparatus according to the first or second aspect; an image forming means for visualizing signals of all pixels outputted from the first horizontal read means; and a setting control means for effecting various setting within the apparatus concerning the next imaging based on signals outputted from the second horizontal read means.

BRIEF DESCRIPTION OF THE DRAWINGS

FIG. 1 shows the color filter arrangement of a prior-art pixel section having exclusive AF pixels among imaging pixels.

FIGS. 2A and 2B show cross-sectional structure of exclusive AF pixels in the pixel section shown in FIG. 1.

DESCRIPTION OF THE PREFERRED EMBODIMENTS

Some embodiments of solid-state imaging apparatus according to the invention and imaging apparatus system using the same will described below with reference to the drawings.

Embodiment 1

Figure 3:
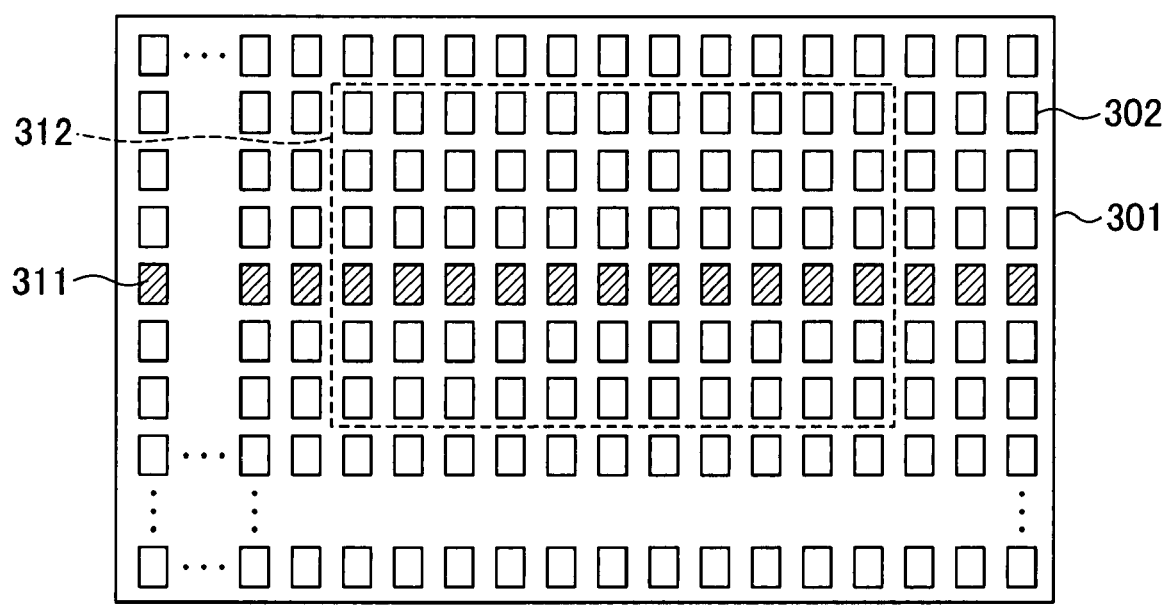
FIG. 3 illustrates the manner for reading AF signals only from a partial region of a prior-art pixel section.
Figure 4:
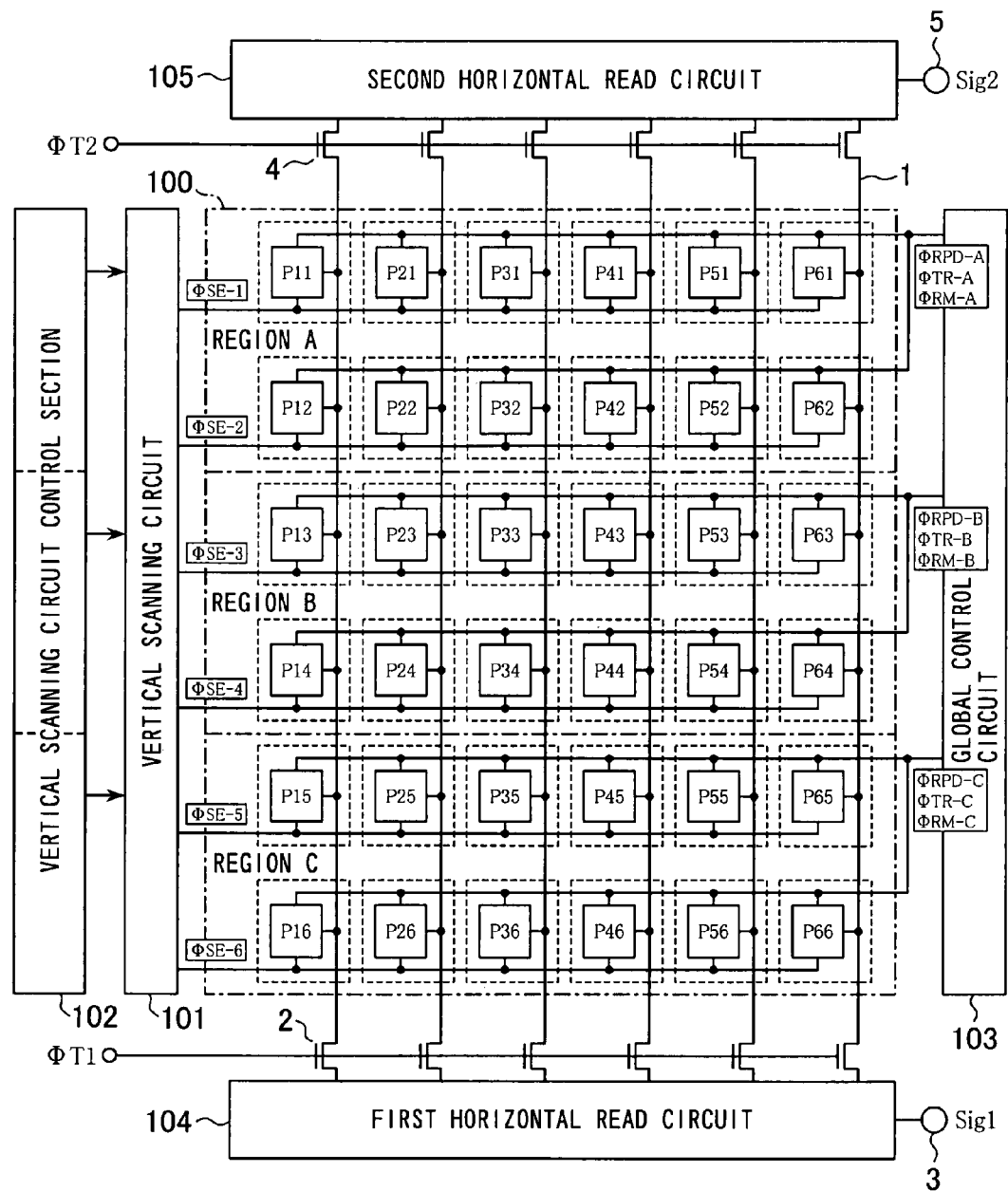
FIG. 4 is a block diagram showing construction of a first embodiment of the solid-state imaging apparatus according to the invention.
Figure 5:
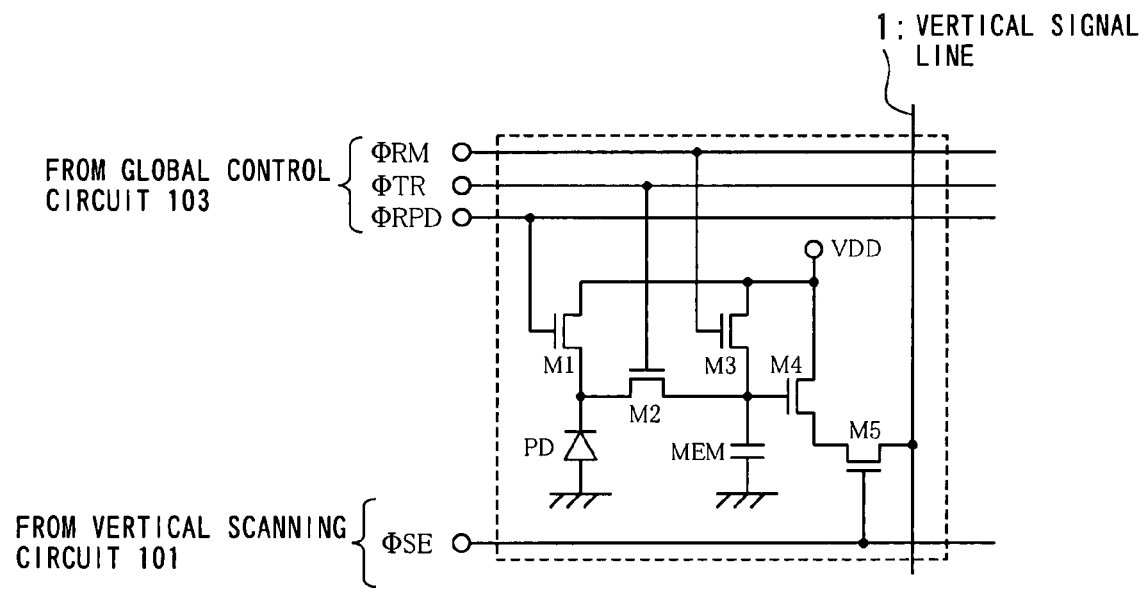
FIG. 5 is a circuit diagram showing construction of a pixel in the solid-state imaging apparatus according to the first embodiment shown in FIG. 4.

A first embodiment of the solid-state imaging apparatus according to the invention will now be described by way of FIGS. 4 and 5. FIG. 4 is a block diagram showing an overall construction of the solid-state imaging apparatus according to the first embodiment; and FIG. 5 shows circuit construction corresponding to one pixel used in the solid-state imaging apparatus shown in FIG. 4. Referring to FIG. 4, denoted by numeral 100 is a pixel section, showing construction of the case where 6×6 pixels indicated by P11 to P66 are arrayed in two dimensions. A vertical scanning circuit 101 selects pixels by treating row as a unit, the signals of pixels of the selected row being outputted to a vertical signal line 1 which is provided for each column. A vertical scanning circuit control section 102 effects control as to which one of the regions the vertical scanning circuit 101 selects from three regions of region A, region B, region C indicated within the pixel section 100. Here, the illustrated example shows the case where the pixel section 100 is divided into three portions each of two rows, as region A, region B, region C. A global (concurrent) control circuit 103 collectively controls operation of all pixels within the pixel section 100, or operation of all pixels within a region selected from region A, region B, region C indicated within the pixel section 100.

Denoted by numeral 104 is a first horizontal read circuit, where signals of pixels corresponding to one row selected by the vertical scanning circuit 101 and outputted onto the vertical signal line 1 are taken in through a fetch switch 2 controlled by fetch pulse ΦT1, and signals of the pixels of the one row are outputted from a first output terminal 3 in time sequence corresponding to their order of arrangement in the horizontal direction. Denoted by numeral 105 is a second horizontal read circuit, where, similarly to the first horizontal read circuit 104, signals of pixels corresponding to one row selected by the vertical scanning circuit 101 and outputted onto the vertical signal line 1 are taken in through a fetch switch 4 controlled by fetch pulse ΦT2, and signals of the pixels of the one row are outputted from a second output terminal 5 in time sequence corresponding to their order of arrangement in the horizontal direction.

The construction of a pixel in the solid-state imaging apparatus having such construction will now be described. Referring to FIG. 5, PD is a photoelectric conversion device, and MEM is a memory device for retaining signal of the photoelectric conversion device PD. Here, memory device MEM is shielded from light so that signal retained at the memory device MEM is not changed even when light is incident on the pixel section 100. M1 is a transistor for resetting photoelectric conversion device PD, controlled by PD reset pulse ΦRPD. M2 is a transistor for transferring signal of photoelectric conversion device PD to memory device MEM, and is controlled by transfer pulse ΦTR. M4 is an amplification transistor which forms a source follower amplifier together with a load (not shown) provided on the vertical signal line 1. The signal of memory device MEM is amplified by the amplification transistor M4, and is outputted onto the vertical signal line 1 through a select transistor M5. The select transistor M5 is controlled by select pulse ΦSE. M3 is a transistor for resetting memory device MEM and an input section of amplification transistor M4, and is controlled by reset pulse ΦRM.

Here, the select pulse ΦSE is outputted from the vertical scanning circuit 101 in the solid-state imaging apparatus shown in FIG. 4, and it is denoted within FIG. 4 by ΦSE-1 to ΦSE-6. PD reset pulse ΦRPD is outputted from the global control circuit 103 in the solid-state imaging apparatus shown in FIG. 4, and the signals to be inputted to region A, region B, region C indicated within the pixel section 100 are respectively denoted in FIG. 4 by ΦRPD-A, ΦRPD-B, ΦRPD-C. Transfer pulse ΦTR and reset pulse ΦRM are outputted from the global control circuit 103 similarly to PD reset pulse ΦRPD, and the signals to be inputted to region A, region B, region C indicated within the pixel section 100 are respectively denoted in FIG. 4 by: ΦTR-A, ΦTR-B, ΦTR-C; ΦRM-A, ΦRM-B, ΦRM-C.

Figure 6:
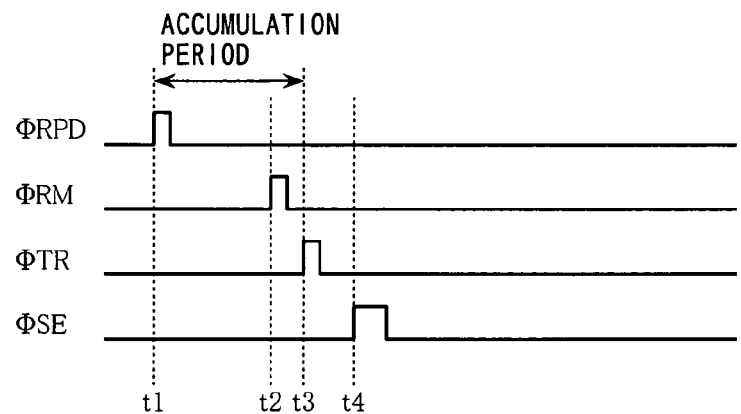
FIG. 6 is a timing chart for explaining an example of operation of the pixel shown in FIG. 5.
Figure 7:
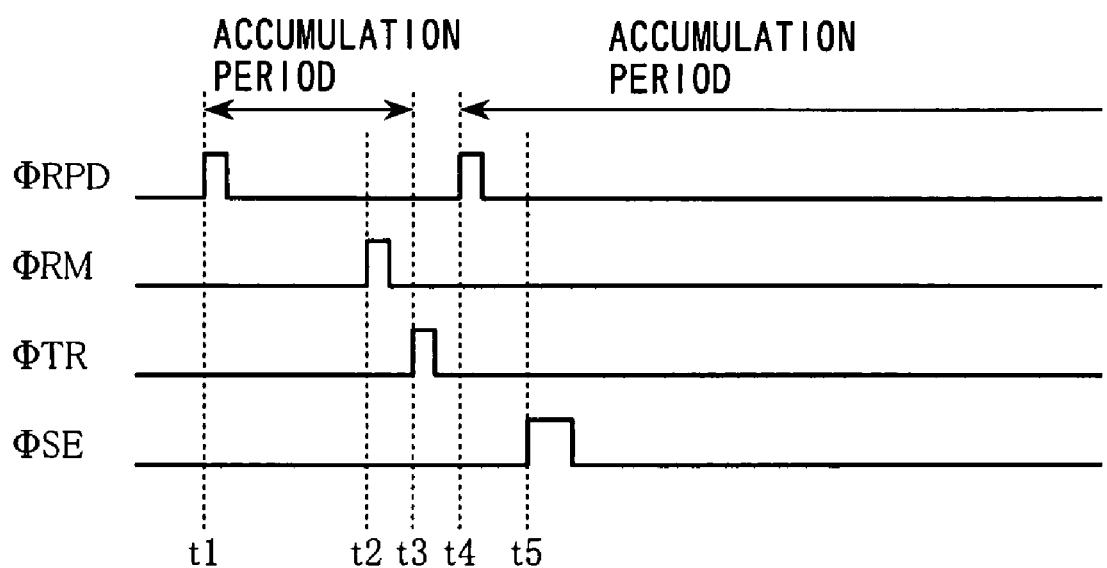
FIG. 7 is a timing chart for explaining another example of operation of the pixel shown in FIG. 5.

Before explaining operation of the solid-state imaging apparatus shown in FIG. 4, the timing chart shown in FIGS. 6 and 7 will now be used to explain operation of the pixel shown in FIG. 5. Referring to FIG. 6, when PD reset pulse ΦRPD is driven to H level, the photoelectric conversion device PD is reset and starts accumulation of signal generated by incident light. At time t2, reset pulse ΦDRM is driven to H level to reset the memory device MEM. Subsequently, at time t3, transfer pulse ΦTR is driven to H level, whereby the signal accumulated up to that point in time at the photoelectric conversion device PD is transferred to and retained at the memory device MEM.

At time t4, then, select pulse ΦSE is driven to H level so that the signal retained at the memory device MEM is amplified and outputted onto the vertical signal line 1. After that, the signal is outputted from an output terminal through the fetch switch, horizontal read circuit (not shown in FIG. 5). With the pixel shown in FIG. 5, therefore, if operation from time t1 to time t3 is effected for example collectively of all pixels, the accumulation period becomes the same for all pixels.

In operation shown in the timing chart of FIG. 7, though it is the same as operation shown in the timing chart of FIG. 6 until when transfer pulse ΦTR becomes H level at time t3, the PD reset pulse ΦRPD is driven to H level at time t4 to reset photoelectric conversion device PD so as to start accumulation. At time t5, then, select pulse ΦSE is driven to H level so that the signal retained at memory device MEM is amplified and outputted to the vertical signal line 1. After that, the signal is outputted from an output terminal through the fetch switch and horizontal read circuit.

In this manner, if operation from time t1 to time t4 is effected for example collectively for all pixels with the pixel shown in FIG. 5, the next accumulation operation can be effected concurrently for all pixels while the signal of photoelectric conversion device PD is transferred to and retained at the memory device MEM.

The operation of the solid-state imaging apparatus according to the first embodiment shown in FIG. 4 will now be described by way of the timing chart shown in FIG. 8. PD reset pulses ΦRPD-A, ΦRPD-B, ΦRPD-C are concurrently driven to H level at time t1 to collectively reset photoelectric conversion device PD of all pixels in the pixel section 100 so as to start accumulation of signal generated by incident light. At time t2, reset pulses ΦRM-A, ΦRM-B, ΦRM-C are concurrently driven to H level to collectively reset the memory device MEM of all pixels. Subsequently, transfer pulses ΦTR-A, ΦTR-B, ΦTR-C are concurrently driven to H level at time t3 so that signals accumulated at the photoelectric conversion device PD up to that point in time are collectively transferred to and retained at the memory device MEM.

Figure 8:
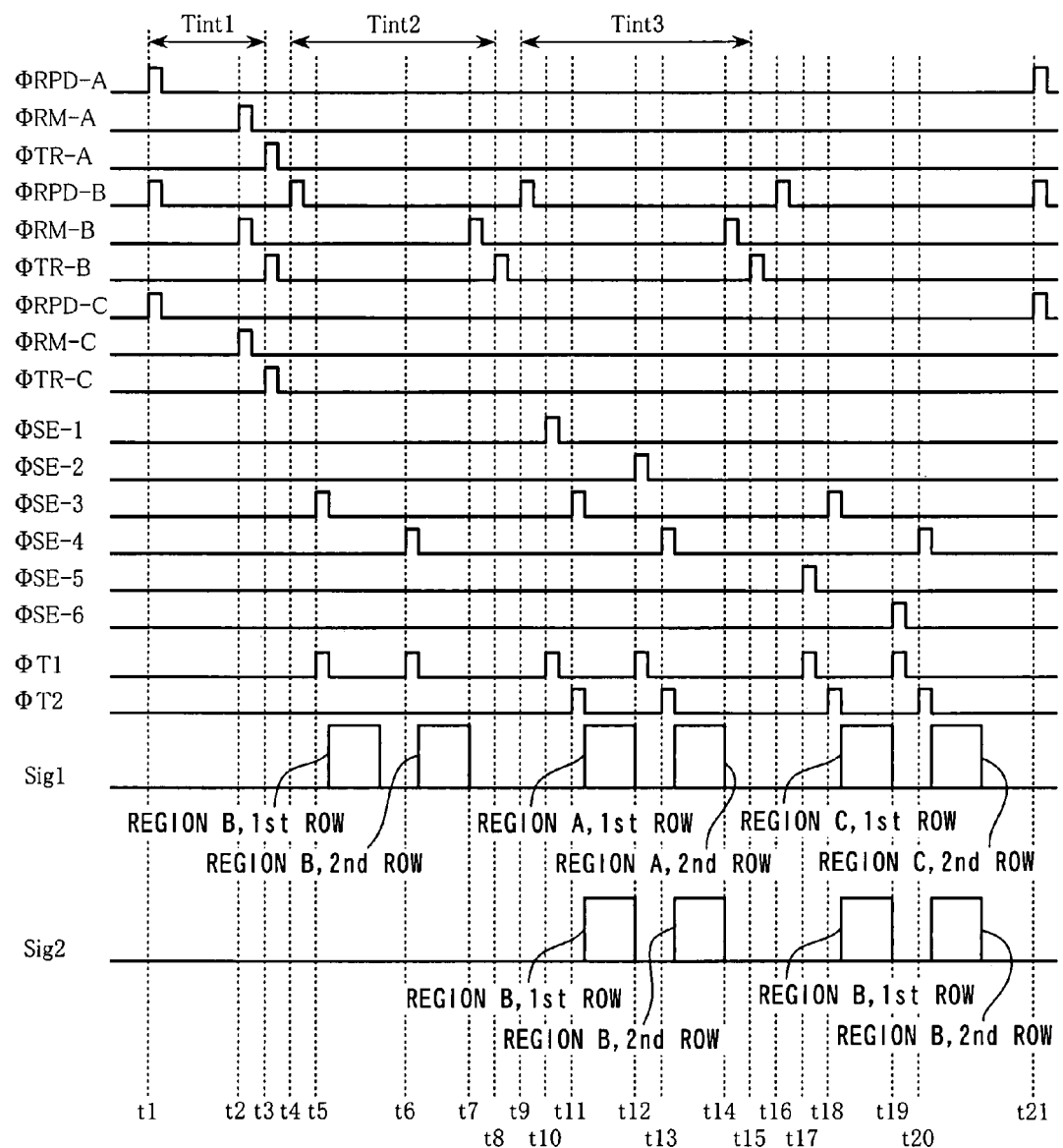
FIG. 8 is a timing chart for explaining operation of the solid-state imaging apparatus according to the first embodiment shown in FIG. 4.

Here, signal retained at the memory device MEM of all pixels is the signal accumulated in the same time for all pixels during a time interval indicated by Tint 1 (time t1 to time t3) in FIG. 8. Subsequently, PD reset pulse ΦRPD-B is driven to H level at time t4 to collectively reset only those photoelectric conversion device PD of the pixels within region B in the pixel section 100 so as to start again accumulation of signal generated by incident light. At time t5, then, select pulse ΦSE-3 is driven to H level to select the pixels of the third row or region B's first row so that the signals retained at memory device MEM of the pixels of the third row are amplified and are outputted to the vertical signal line 1. At this time, the fetch pulse ΦT1 is also concurrently driven to H level so that the signals outputted to the vertical signal line 1 are taken into the first horizontal read circuit 104 and are outputted from the output terminal 3 in time sequence corresponding to their order of arrangement in the horizontal direction.

In the timing chart shown in FIG. 8, the output signals from the first output terminal 3 are indicated by Sig1. Subsequently, select pulse ΦSE-4 is driven to H level at time t6 so that the pixels of the fourth row or region B's second row are selected to output the signals of pixels of the second row of region B from the first output terminal 3 similarly to the first row of region B.

Next, reset pulse ΦRM-B is driven to H level at time t7 to collectively reset the memory device MEM of the pixels in region B of the pixel section 100. Subsequently, transfer pulse ΦTR-B is driven to H level at time t8 so that, of the pixels within region B, the signals accumulated at photoelectric conversion device PD are collectively transferred to and retained at memory device MEM. Here, signal retained at the memory device MEM is the signal accumulated for a time interval indicated by Tint2 (time t4 to time t8) in FIG. 8.

Subsequently, PD reset pulse ΦRPD-B is driven to H level at time t9 so that only those photoelectric conversion device of the pixels of region B are collectively reset to start accumulation of signal generated by incident light for the third time. The select pulse ΦSE-1 is then driven to H level at time t10 to select the first row or region A's first row in the pixel section 100 so that signals retained at memory device MEM of the pixels of the first row are amplified and outputted to the vertical signal line 1. At this time, the fetch pulse ΦT1 is also concurrently driven to H level so that the signals outputted onto the vertical signal line 1 are taken to the first horizontal read circuit 104 and are outputted from the first output terminal 3 in time sequence corresponding to their order of arrangement in the horizontal direction. Here, signal of the pixels in the first row of region A outputted from the first output terminal 3 corresponds to the signal accumulated for a time interval indicated by Tint1 in FIG. 8.

Further, at time t11, the pixels of the third row or region B's first row of the pixel section 100 are selected again by driving select pulse ΦSE-3 to H level so that the signals retained at memory device MEM of the pixels of this row are amplified and outputted to the vertical signal line 1. At this time, fetch pulse ΦT2 is concurrently driven to H level so that the signals outputted to the vertical signal line 1 are taken into the second horizontal read circuit 105 and are outputted from the second output terminal 5 in time sequence corresponding to their order of arrangement in the horizontal direction. In the timing chart shown in FIG. 8, the output signal from the second output terminal 5 is indicated by Sig2. Here, signal of the pixel of the first row of region B outputted from the second output terminal 5 corresponds to the signal accumulated in a time interval indicated by Tint2 in FIG. 8.

At following time t12, select pulse ΦSE-2 and fetch pulse ΦT1 are concurrently driven to H level, and then at time t13, select pulse ΦSE-4 and fetch pulse ΦT2 are concurrently driven to H level so that signals of the pixels of the second row or region A's second row and signals of the pixels of the fourth row or region B's second row are outputted from the first output terminal 3 and the second output terminal 5, respectively, in time sequence corresponding to their order of arrangement in the horizontal direction. Here, signal of the pixels of the second row of region A outputted from the first output terminal 3 corresponds to the signal accumulated in a time interval indicated by Tint1 in FIG. 8, and signal of the pixels of the second row of region B outputted from the second output terminal 5 corresponds to the signal accumulated in a time interval indicated by Tint2 in FIG. 8.

At time t14 and after, operation similar to the operation for the pixels in region B and region A after time t7 is effected of the pixels of region B and region C so that signals of the pixels of the first and second rows of region C corresponding to the signal accumulated in a time interval indicated by Tint1 in FIG. 8 are outputted from the first output terminal 3, and signals of the pixels of the first and second rows of region B corresponding to the signal accumulated in time interval (time t9 to time t15) indicated by Tint3 in FIG. 8 are outputted from the second output terminal 5.

As has been described above, with the solid-state imaging apparatus of the present embodiment, it is possible to concurrently obtain from the first output terminal 3 signals of all pixels accumulated concurrently for all pixels in time interval indicated by Tint1 in FIG. 8, and from the second output terminal 5 signals from the pixels of region B corresponding to incident light after the time interval indicated by Tint1 in FIG. 8. Accordingly, with a single solid-state imaging apparatus, it is possible, while performing an imaging using information of all pixels, to simultaneously obtain control signals such as AF and AE signals for determining image taking conditions of the next imaging to be performed at time t21 and after.

In the present embodiment, operation has been described of the case where the pixel section 100 is divided into three regions, and signals of the pixels of region B at the middle are outputted in repetition together with the output of signals of the pixels of the other regions A, C. In dividing the pixel section 100 into regions, it is only required to divide it correspondingly to the divisional region of AF or AE or of both of the imaging apparatus system in which the solid-state imaging apparatus according to the invention is used; and region to be repetitively outputted may be set to the region to be observed in AF or AE when image is taken.

Embodiment 2

Figure 9:
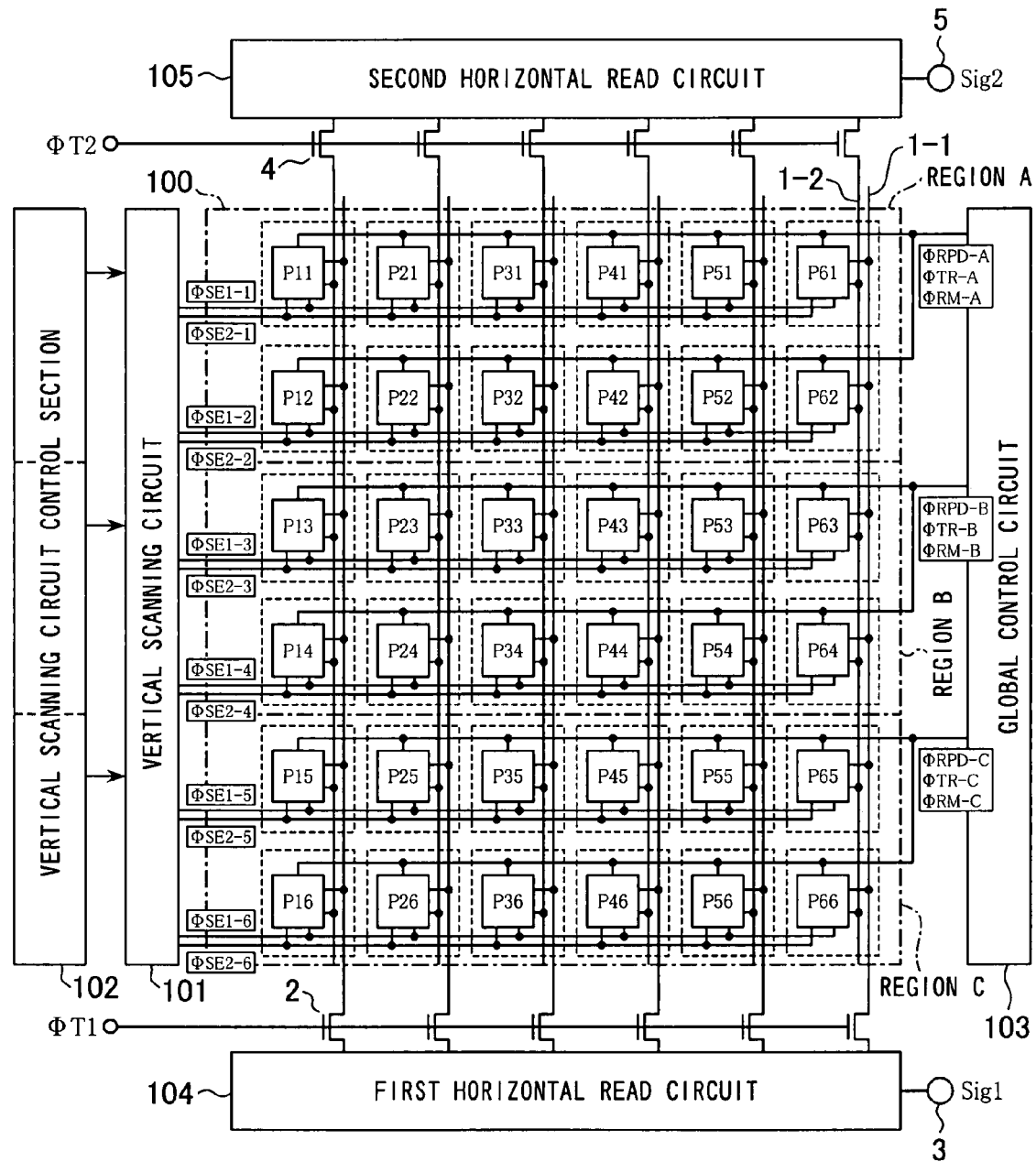
FIG. 9 is a block diagram showing construction of a second embodiment of the solid-state imaging apparatus according to the invention.
Figure 10:
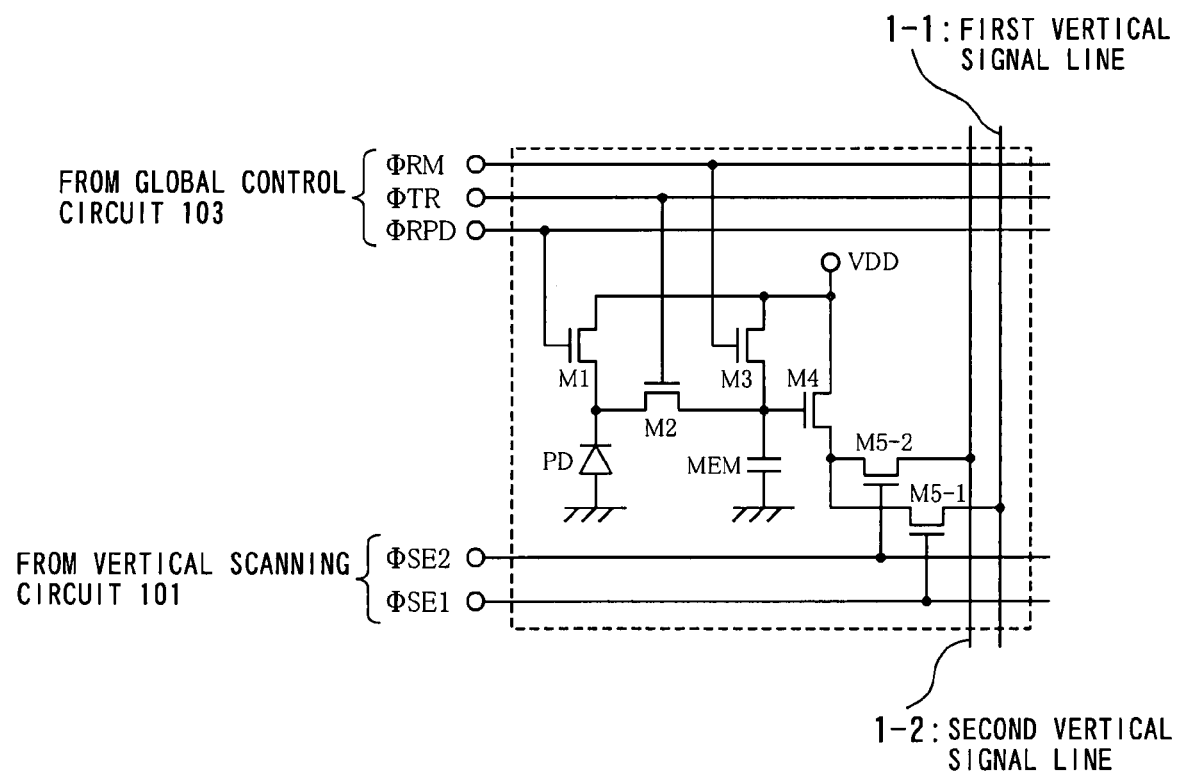
FIG. 10 is a circuit diagram showing construction of a pixel in the solid-state imaging apparatus according to the second embodiment shown in FIG. 9.

The solid-state imaging apparatus according to a second embodiment will be described below by way of FIGS. 9 and 10. FIG. 9 is a block diagram showing an overall construction of the solid-state imaging apparatus according to the second embodiment; and FIG. 10 shows a circuit construction corresponding to one pixel used in the solid-state imaging apparatus shown in FIG. 9. The circuit construction corresponding to one pixel used in the solid-state imaging apparatus according to the present embodiment will now be described. The pixel construction shown in FIG. 10 is different from construction of pixel shown in FIG. 5 of the solid-state imaging apparatus according to the first embodiment in that: there are two select transistors as indicated by M5-1 and M5-2 in FIG. 10; there are two select pulses for controlling these as indicated by ΦSE-1 and ΦSE-2; and there are two vertical signal lines to be connected to the two select transistors M5-1, M5-2 as indicated by 1-1 and 1-2. The construction of the other portions is similar to the pixel construction of the first embodiment shown in FIG. 5 and will not be described.

A description will now be given with respect to the construction of the solid-state imaging apparatus according to the second embodiment shown in FIG. 9 where pixels of the construction shown in FIG. 10 are used. In this solid-state imaging apparatus, there are two select pulses for each row to be outputted from the vertical scanning circuit 101 as indicated by ΦSE-1-1, ΦSE2-1 to ΦSE1-6, ΦSE-2-6, and there are also two vertical signal lines for each column. Then the difference from the construction of the solid-state imaging apparatus according to the first embodiment shown in FIG. 4 is that the first vertical signal line 1-1 is connected to fetch switch 2 to be controlled by fetch pulse ΦT1, and the second vertical signal line 1-2 is connected to fetch switch 4 to be controlled by fetch pulse ΦT2. The construction other than these is similar to the first embodiment shown in FIG. 4 and will not be described.

Figure 11:
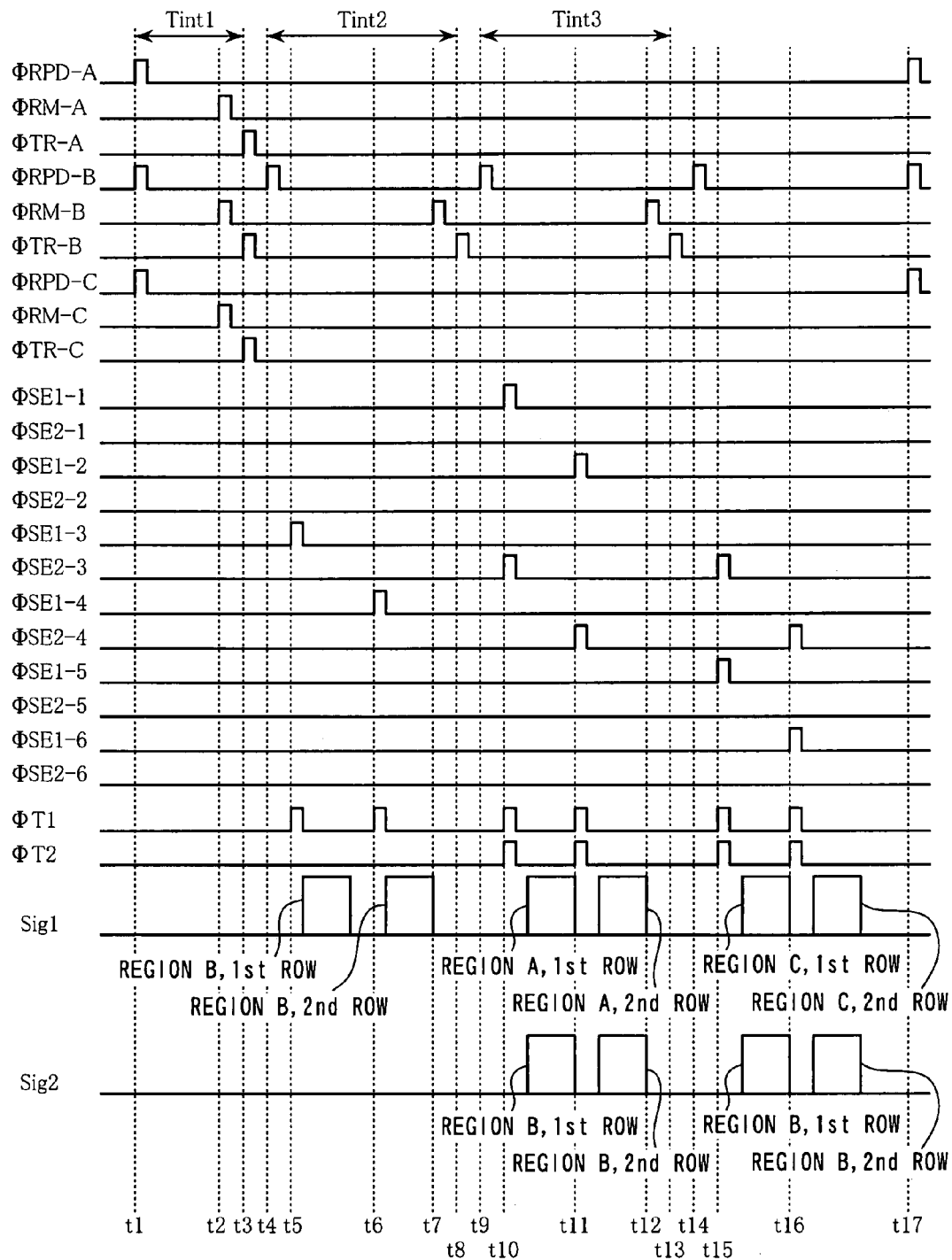
FIG. 11 is a timing chart for explaining operation of the solid-state imaging apparatus according to the second embodiment shown in FIG. 9.

An operation of the solid-state imaging apparatus according to the second embodiment shown in FIG. 9 will now be described by way of the timing chart shown in FIG. 11. Referring to FIG. 11, the operation from time t1 to time t9 is the same as the operation of the first embodiment shown in the timing chart of FIG. 8 and will not be described; an operation at time t10 and after will now be described. The first select pulse ΦSE1-1 is driven to H level at time t10 to select the pixels of the first row or region A's first row in the pixel section 100 so that signals retained at memory device MEM of the pixels of the first row are amplified and are outputted to the first vertical signal line 1-1. At this time, fetch pulse ΦT1 is also concurrently driven to H level so that the signals outputted to the first vertical signal line 1-1 are taken into the first horizontal read circuit 104 and are outputted from the first output terminal 3 in time sequence corresponding to order of their arrangement in the horizontal direction. Here, signal of the pixels of the first row of region A outputted from the first output terminal 3 corresponds to the signal accumulated for a time interval (time t1 to time t3) indicated by Tint1 in FIG. 11.

Also at time t10, the second select pulse ΦSE2-3 is also concurrently driven to H level to select again the pixels of the third row or region B's first row in the pixel section 100 so that signals retained at memory device MEM of the pixels of the third row are amplified and outputted to the second vertical signal line 1-2. At this time, since fetch pulse ΦT2 is also concurrently being driven to H level, the signals outputted to the second vertical signal line 1-2 are taken into the second horizontal read circuit 105 and are outputted from the second output terminal 5 in time sequence corresponding to their order of arrangement in the horizontal direction. Here, signal of the pixels of the first row of region B outputted from the second output terminal 5 corresponds to the signal accumulated for a time interval (time t4 to time t8) indicated by Tint2 in FIG. 11.

At following time t11, the first select pulse ΦSE1-2 and fetch pulse ΦT1, and in addition the second select pulse ΦSE2-4 and fetch pulse ΦT2 are concurrently driven to H level so as to output the signals of the pixels of the second row or region A's second row and the signals of the pixels of the fourth row or region B's second row, respectively, from the first output terminal 3 and second output terminal 5 in time sequence corresponding to their order of arrangement in the horizontal direction. Here, signal of the pixels of the second row of region A outputted from the first output terminal 3 corresponds to the signal accumulated in a time interval indicated by Tint1 in FIG. 11, and signal of the pixels of the second row of region B outputted from the second output terminal 5 corresponds to the signal accumulated in a time interval indicated by Tint2 in FIG. 11.

In this manner, with the solid-state imaging apparatus of the present embodiment, since two select transistors are provided for each pixel and two vertical signal lines for each column, signals of the pixels corresponding to two rows can be taken simultaneously into the first horizontal read circuit 104 and second horizontal read circuit 105. Accordingly, in taking the pixel signals corresponding to two rows respectively into the first and second horizontal read circuits 104, 105, operation time for the reading can be reduced as compared to the solid-state imaging apparatus according to the first embodiment where it has been effected with using time division.

Similarly at time t15 and after, signals of the pixels corresponding to two lines can be concurrently taken respectively into the first horizontal read circuit 104 and second horizontal read circuit 105 also in the signal outputting operation of the pixels of the first and second rows of region C corresponding to the signal accumulated in a time interval indicated by Tint1 in FIG. 11 and in the signal outputting operation of the pixels of the first and second rows of region B corresponding to the signal accumulated in a time interval indicated by Tint3 in FIG. 11.

As has been described above, with the solid-state imaging apparatus according to the second embodiment, the signals of all pixels accumulated concurrently for all pixels in a time interval indicated by Tint1 in FIG. 11 from the first output terminal 3, and signals of the pixels of region B corresponding to incident light after the time interval indicated by Tint1 in FIG. 11 from the second output terminal 5 can be obtained concurrently and in a shorter time as compared to the solid-state imaging apparatus according to the first embodiment. Accordingly, it is similar to the solid-state imaging apparatus according to the first embodiment that, while effecting an imaging using information of all pixels, it is possible with a single solid-state imaging apparatus to concurrently obtain control signals such as AF and AE signals for determining image taking conditions of the next imaging which is to be performed at time t17 and after.

In the present embodiment, an operation has been described of the case where the pixel section 100 is divided into three regions, and signals of the pixels of region B at the middle are outputted in repetition together with the output of the pixel signals of the other regions A, C. In dividing the pixel section 100 into regions, however, it is only required to divide it correspondingly to the divisional region of AF or AE or of both of the imaging apparatus system in which the solid-state imaging apparatus according to the invention is used; and region to be repetitively outputted may be set to the region to be observed in AF or AE when image is taken.

It should be noted that, in the first and second embodiments, the order of regions according to which the signals of all pixels accumulated simultaneously for all pixels in the time interval indicated by Tint1 are outputted from the first output terminal 3 is determined by controlling the vertical scanning circuit 101 with the vertical scanning circuit control section 102. When for example the vertical scanning circuit 101 is constructed of a decoder, the rows of pixel section 100 can be selected in an optional order by changing the signals for driving the decoder at the vertical scanning circuit control section 102. Further, when the vertical scanning circuit 101 is constructed of a shift register, the order of regions to be selected can be optionally changed by providing a plurality of locations for inputting start signal of the shift register correspondingly to the divided regions in pixel section 100 so as to control the input location of start signal by the vertical scanning circuit control section 102.

Figure 12:
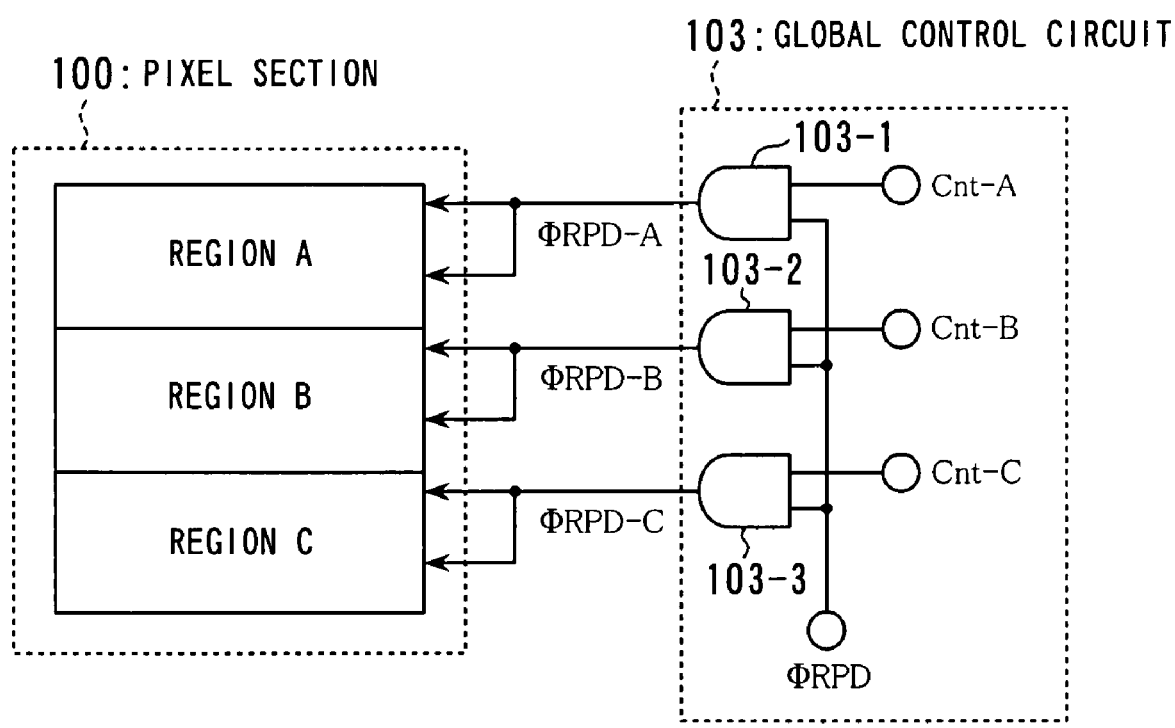
FIG. 12 is a block diagram showing an example of construction of the global control circuit in the solid-state imaging apparatus according to the second embodiment shown in FIG. 9.

Further, operation of effecting collectively for all pixels or for each region the reset of photoelectric conversion device PD and memory device MEM of pixel, as well as the transfer from photoelectric conversion device PD to memory device MEM is controlled by the global control circuit 103. An example of construction of the global control circuit 103 is shown in FIG. 12. Here, a description will be given of PD reset pulse ΦRPD as an example. Referring to FIG. 12, the manner of dividing the pixel section 100 into three regions of region A, region B, region C, and inputting PD reset pulses ΦRPD-A, ΦRPD-B, ΦRPD-C to the respective regions from the global control circuit 103 is the same as the manner indicated in FIGS. 4 and 9. The global control circuit 103 is configured to output PD reset pulse ΦRPD as reset pulse ΦRPD-A, ΦRPD-B, ΦRPD-C to each region through AND circuits 103-1, 103-2, 103-3 to which the PD reset pulse ΦRPD and control signal Cnt-A, Cnt-B, Cnt-C are respectively inputted.

In the global control circuit 103 having such construction, when all of control signals Cnt-A, Cnt-B, Cnt-C are driven to H level, the same signal is outputted to each of all the regions as PD reset pulse ΦRPD-A, ΦRPD-B, ΦRPD-C so as to collectively reset photoelectric conversion device PD of all pixels of the pixel section 100. When control signal Cnt-B alone is driven to H level, signal is then outputted only for PD reset pulse ΦRPD-B to region B so as to collectively reset photoelectric conversion device PD of the pixels of region B. Further, it is also possible to add to the global control circuit 103 the reset function of photoelectric conversion device PD and memory device MEM of pixel as well as function for effecting, row by row, transfer from photoelectric conversion device PD to memory device MEM. These added functions can be achieved for example by constructing the global control circuit with a decoder.

The construction of a pixel used in the solid-state imaging apparatus according to the invention is not limited to the construction of pixel used in the solid-state imaging apparatus according to the above embodiments 1 and 2, and may be any pixel having a photoelectric conversion device and means for resetting signal thereof, and a memory device capable of retaining signal of the photoelectric conversion device. If for example the construction is such that a full and complete transfer is possible in transferring signal from photoelectric conversion device PD to memory device MEM, the transistor M1 for resetting photoelectric conversion device PD can be eliminated, since the photoelectric conversion device PD is reset at the same time of the transfer of such signal.

It should be noted that, while noise in a pixel signal is generally increased when an amplification device (amplifying transistor) is provided in the pixel, it is naturally possible to provide a means for suppressing this for example within the horizontal read circuit and to effect drive accordingly. The construction of the horizontal read circuit is not specifically limited and is only required to be such that signals of the pixels outputted to the vertical signal line are outputted in time sequence corresponding to order of arrangement of the pixels in the horizontal direction.

Embodiment 3

Figure 13:
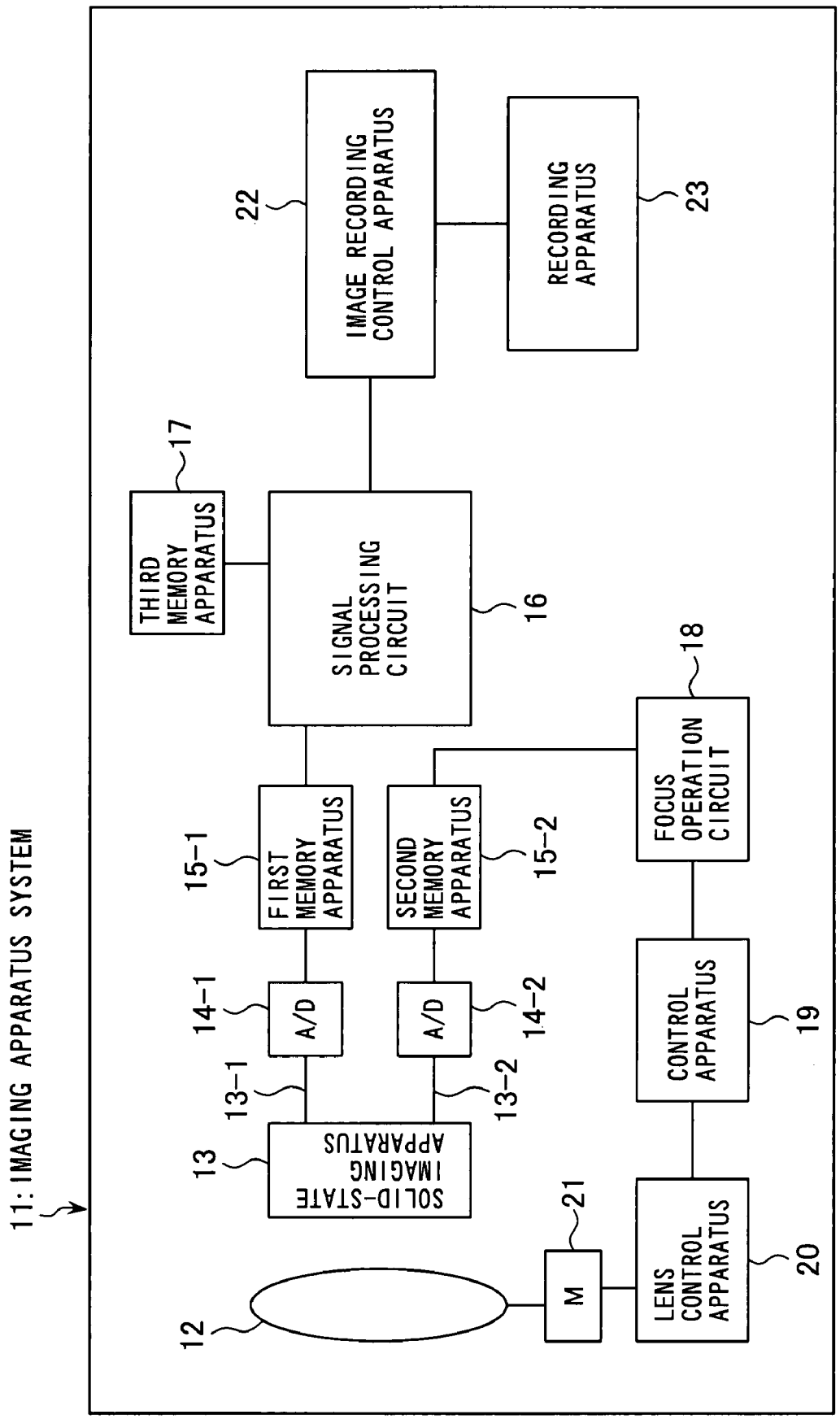
FIG. 13 is a block diagram showing an embodiment of the imaging apparatus system according to the invention.

An embodiment of the imaging apparatus system according to the invention will now be described as a third embodiment. The construction of imaging apparatus system according to this embodiment is shown in FIG. 13. Referring to FIG. 13, an overall construction of imaging apparatus system according to the present embodiment is denoted by 11. Denoted by 12 is a lens apparatus for taking image, and 13 is a solid-state imaging apparatus as described in the first or second embodiment, where only a partial region (region A or region B or region C) of the pixel section can be outputted in repetition in parallel with the signals of all pixels. Here the signals of all pixels are outputted from the first output terminal 13-1, and the signals of the partial pixel region to be outputted in repetition are outputted from the second output terminal 13-2. Denoted by 14-1, 14-2 are first and second A/D conversion apparatus where output signals of the solid-state imaging apparatus 13 corresponding to incident light forming an image on the pixel section of the solid-state imaging apparatus 13 are converted into digital signals. The first and second A/D conversion apparatus 14-1, 14-2 are connected respectively to the first output terminal 13-1 and second output terminal 13-2. Denoted by 15-1, 15-2 are first and second memory apparatus for temporarily recording image signals after A/D conversion, provided correspondingly to the above two units of first and second A/D conversion apparatus 14-1, 14-2. Denoted by 16 is a signal processing circuit for processing the image signals of all pixels saved at the memory apparatus 15-1; 17 is a third memory apparatus for temporarily storing image signals after processing at the signal processing circuit 16; and 18 is a focus operation circuit for detecting sharpness of image to judge focus condition with using the signals of a partial pixel region saved at the second memory apparatus 15-2, evaluating in this case high-frequency components of image extracted through a band-pass filter.

Also referring to FIG. 13, denoted by 19 is a control apparatus for administering control of the whole of the imaging system 11, which administers all including the reading of signals from the solid-state imaging apparatus 13, control of the first and second A/D conversion apparatus 14-1, 14-2, recording to the first and second memory apparatus 15-1, 15-2, and control of the signal processing circuit 16. Denoted by 20 is a lens control apparatus for controlling the lens apparatus 12 into focus based on the result of focus condition determined at the focus operation circuit 18. Denoted by 21 is a lens drive apparatus including a motor for driving the lens apparatus 12 upon receipt of signal from the lens control apparatus 20. Denoted by 22 is an image recording control apparatus for receiving image produced at the signal processing circuit 16 and administering its recording to a recording apparatus 23. The recording apparatus 23 is to record images obtained at the end.

Figure 14:
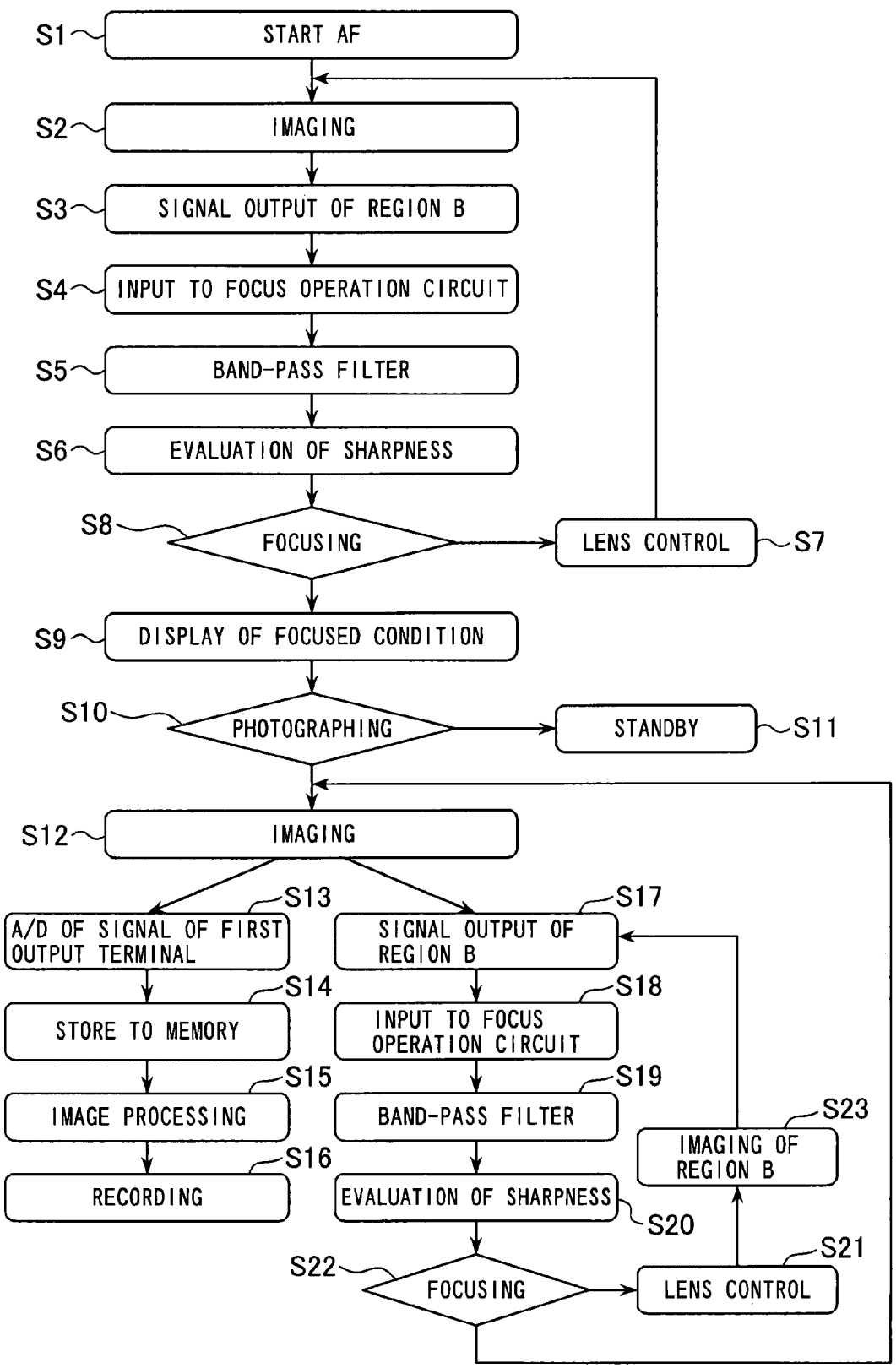
FIG. 14 is a flowchart for explaining operation of the imaging apparatus system shown in FIG. 13.

An operation of the imaging apparatus system constructed as the above will now be described by way of the flowchart shown in FIG. 14. First at step S1, start of AF is instructed. When start of AF has been instructed, the control apparatus 19 of the imaging apparatus system 11 instructs start of imaging (step S2). Here, an operation of the batch reset, accumulation, and batch transfer is effected only of region B of the pixel section of the solid-state imaging apparatus 13 so that signals corresponding to object image collected through the lens apparatus 12 are outputted from the second output terminal 13-2 of the solid-state imaging apparatus 13 (step S3). The signals of region B outputted from the second output terminal 13-2 of the solid-state imaging apparatus 13 are A/D-converted at the second A/D conversion apparatus 14-2 under instruction of the control apparatus 19, and are inputted to the focus operation circuit 18 (step S4). At the focus operation circuit 18, the received signals are put through a band-pass filter within the focus operation circuit 18 to extract high-frequency components (step S5) and evaluate sharpness of the high-frequency components (step S6).

The control apparatus 19 then instructs drive of the lens apparatus 12 to the lens control apparatus 20. The direction of drive of the lens apparatus 12 may either be toward near or be toward infinity. The lens drive apparatus 21 moves the lens apparatus 12 in accordance with instruction by the lens control apparatus 20 (step S7). When drive of lens apparatus 12 is complete, the solid-state imaging apparatus 13 takes image again only of region B under direction of the control apparatus 19 (step S2). After completion of such imaging, operation similar to the above is effected again to evaluate again sharpness of the image (step S2 to S6). If sharpness of image is increased as a result of re-evaluation, the lens apparatus 12 is driven to the same direction again (step S7). If the result of the re-evaluation indicates a lowered sharpness of the image, the lens apparatus 12 is driven in an opposite direction from the last time (step S7). The above operation is repeated, and when a position where sharpness attains its peak is found, the autofocus operation is complete (step S8). This is nothing more than the theory of the so-called hill climbing AF method.

When judged as in focus at step S8, the system displays an indication of focused condition on a display apparatus (not shown) (step S9). An instruction for image taking from the photographer is then awaited (step S10). If there is no instruction for image taking, the imaging apparatus system 11 is on standby (step S11). If there is an instruction for image taking, image is taken under direction of the control apparatus 19 (step S12).

Here, as has been explained of the operation in the first or second embodiment, an operation of global (concurrent) reset, accumulation, and global transfer is effected of the entire region of the pixel section of the solid-state imaging apparatus 13, and at first the signals of region B are outputted from the first output terminal 13-1. Subsequently, the signals of regions A, C are outputted from the first output terminal 13-1, and in parallel therewith the signals of region B are outputted again in repetition from the second output terminal 13-2. Here, the signals outputted from the first output terminal 13-1 of the solid-state imaging apparatus 13 are A/D converted at the first A/D converter apparatus 14-1 (step S13), and the A/D converted image signals are temporarily stored at the first memory apparatus 15-1 (step S14).

The image signals stored at the first memory apparatus 15-1 are subjected to image processing at the signal processing circuit 6 (step S15), stored to the third memory apparatus 17, and recorded to the recording apparatus 23 through the image recording control apparatus 22 (step S16) so that a taken image using information of all pixels is obtained. On the other hand, of the signals of region B outputted from the second output terminal 13-2 of the solid-state imaging apparatus 13, sharpness of the image is evaluated as operation similar to steps S2 to S6 is effected, and, when a focused condition is attained, the next imaging becomes possible (steps S17 to S23).

As has been described above, the imaging apparatus system according to the present embodiment is capable of concurrently obtaining from the first output terminal the signals of all pixels accumulated simultaneously for all pixels in the solid-state imaging apparatus, and from the second output terminal the signals of region B corresponding to incident light after such accumulation time interval. In other words, while performing an imaging using information of all pixels, AF operation for determining the image taking conditions of the next imaging can be effected.

While the focusing method in the description of the imaging apparatus system according to the above embodiment has been described with using the hill climbing AF method, other methods may also be used as the evaluation method of autofocus. It should be noted that, while a description of the present embodiment has been made of the case where the signals obtained from the second output terminal of the solid-state imaging apparatus are applied to AF operation, it is naturally also possible to apply these signals to AE operation. Further, while a description of the present embodiment has been made of an operation in the case where the pixel section of the solid-state imaging apparatus is divided into three regions and the signals of the pixels of region B are outputted in repetition, the division into regions of the pixel section is only required to divide it correspondingly to the divisional region of AF or AE or both of the imaging apparatus system in which the solid-state imaging apparatus is used. It suffices that the region to be outputted in repetition is set to an observed region of AF or AE at the time of imaging. The construction of the imaging apparatus system includes but not limited to the present embodiment, and is only required to be able to perform operation for determining image taking conditions of the next imaging while effecting an imaging using information of all pixels.

As has been described by way of the above embodiments, it is possible with the solid-state imaging apparatus and imaging apparatus system according to the invention to effect reset and accumulation of photoelectric conversion device concurrently for all pixels, to transfer the accumulated signal to a memory means, and then at the same time of reading the signals of all pixels, to repeat reset, accumulation, and transfer of photoelectric conversion device only for those pixels of a partial region of the pixel selection, making it possible to output them in parallel with the signals of all pixels. Accordingly, at the same time of high-quality signals of all pixels for forming an image, control signals such as of AF and AE for determining image taking conditions of the next imaging can be obtained.

What is claimed is:

1. A solid-state imaging apparatus including a pixel section having a plurality of pixels arrayed in two dimensions, each having a photoelectric conversion device, a means for resetting signal accumulated at the photoelectric conversion device, a memory means for retaining signal accumulated at said photoelectric conversion device, and a transfer means for transferring signal accumulated at said photoelectric conversion device to said memory means, the signal retained at said memory means being outputted as signal of said pixel, said solid-state imaging apparatus comprising:

a global control means, said pixel section having a plurality of pixel regions divided in row direction, for concurrently effecting said reset operation and said transfer operation, respectively, with treating said divided pixel region as a unit;

a vertical scanning means for controlling sequence in outputting signals of said pixels with treating said divided pixel region as a unit; and a first and a second horizontal read means for outputting signals of the pixels of two pixel regions in parallel with considering said divided pixel region as unit;

wherein, after passage of a desired accumulation time from said reset operation with respect to all pixels of said pixel section concurrently effected by said global control means, said first horizontal read means outputs signals of all pixels of said pixel section obtained by concurrently effecting said transfer operation, and wherein said second horizontal read means, with respect to an optional pixel region narrower than said pixel section selected from the plurality of said divided pixel regions, outputs signals of the pixels of the optional pixel region obtained as a result that said global control means respectively effects said reset operation and said transfer operation on regular interval.

2. An imaging apparatus system comprising:

the solid-state imaging apparatus according to claim 1;

an image forming means for visualizing signals of all pixels outputted from said first horizontal read means; and a setting control means for effecting various setting within the apparatus concerning the next imaging based on signals outputted from said second horizontal read means.

\* \* \* \* \*